United States Patent [19]
Tannous et al.

[11] Patent Number: 5,989,518
[45] Date of Patent: Nov. 23, 1999

[54] PROCESS FOR SYNTHESIZING AND CONTROLLING THE PARTICLE SIZE AND PARTICLE SIZE DISTRIBUTION OF A MOLECULAR SIEVE

[75] Inventors: Medhat Khalil Tannous, Arlington Heights; Sonu Marchioretto, Downers Grove; Lyle Edward Monson, Rolling Meadows, all of Ill.

[73] Assignee: UOP LLC, Des Plaines, Ill.

[21] Appl. No.: 09/222,109

[22] Filed: Dec. 29, 1998

[51] Int. Cl.$^6$ .......................... C01B 39/22; C01B 39/24; C01B 39/14; C01B 37/04
[52] U.S. Cl. .......................... 423/717; 423/709; 423/716; 423/305; 423/306; 423/328.2; 423/335; 423/DIG. 21; 423/DIG. 24; 423/DIG. 30
[58] Field of Search .......................... 423/700, 702, 423/705, 709, 710, 711, 716, 717, 305, 306, 328.2, 335, DIG. 21, DIG. 24, DIG. 30

[56] References Cited

U.S. PATENT DOCUMENTS

| | | | |
|---|---|---|---|
| 3,310,373 | 3/1967 | Johnson | 423/711 |
| 3,425,800 | 2/1969 | Hirsh . | |
| 3,886,094 | 5/1975 | Pilato et al. . | |
| 4,310,440 | 1/1982 | Wilson et al. . | |
| 4,336,234 | 6/1982 | Leutner et al. | 423/714 |
| 4,368,174 | 1/1983 | Valyocsik | 422/208 |
| 4,371,510 | 2/1983 | Christophliemk et al. | 423/717 |
| 4,374,093 | 2/1983 | Rollmann et al. | 422/202 |
| 4,385,042 | 5/1983 | Whitehurst et al. | 423/711 |
| 4,440,871 | 4/1984 | Lok et al. . | |
| 4,591,491 | 5/1986 | Christophliemk et al. | 423/711 |
| 4,818,509 | 4/1989 | Dwyer et al. | 423/709 |
| 4,853,197 | 8/1989 | Wilson et al. | 423/306 |
| 4,880,761 | 11/1989 | Bedard et al. | 502/215 |
| 5,089,243 | 2/1992 | Thome et al. | 423/710 |
| 5,100,636 | 3/1992 | Thome et al. . | |
| 5,302,362 | 4/1994 | Bedard | 423/306 |
| 5,427,765 | 6/1995 | Inoue et al. | 423/705 |

FOREIGN PATENT DOCUMENTS

| | | |
|---|---|---|
| 0 021 675 B1 | 9/1983 | European Pat. Off. . |
| 525 272 | 2/1993 | European Pat. Off. . |
| 152 525 | 12/1981 | German Dem. Rep. . |
| 30 11 834 | 10/1981 | Germany . |
| 2252305 | 8/1992 | United Kingdom . |

*Primary Examiner*—Mark L. Bell
*Assistant Examiner*—David Sample
*Attorney, Agent, or Firm*—Thomas K. McBride; Frank S. Molinaro

[57] ABSTRACT

Applicants have developed a continuous process for synthesizing various molecular sieves. The process enables one to control both the particle size and particle size distribution. Any of the molecular sieves represented by the empirical formula on an anhydrous basis: $rR_2O:(Si_xAl_yP_z)O_2$, where R is at least one templating agent, "r" "x" "y" and "z" are the mole fractions of R, Si, Al and P respectively, can be prepared using this process. The process involves continuously adding reactive sources of the desired components along with a structure directing agent into a continuous crystallization reactor. Either interstage backmixing is introduced or the number of stages is adjusted in order to control particle size. Finally, one way to control particle size distribution is to split the product stream into at least two streams and flowing each stream to a wet miller operated at different severity and then reblending to obtain at least a bimodal distribution.

13 Claims, No Drawings

PROCESS FOR SYNTHESIZING AND CONTROLLING THE PARTICLE SIZE AND PARTICLE SIZE DISTRIBUTION OF A MOLECULAR SIEVE

FIELD OF THE INVENTION

This invention relates to a process for continuously synthesizing a molecular sieve. More specifically, the process involves controlling either the amount of interstage backmixing in a continuous reactor or the number of stages in order to control particle size. Further, at least a bimodal particle size distribution can be obtained by dividing the molecular sieve product stream into at least two streams which are continuously wet milled with different severities (in parallel) and then reblended.

BACKGROUND OF THE INVENTION

Zeolites are crystalline aluminosilicate microporous compositions that are well known in the art. There are over 150 species of both naturally occurring and synthetic zeolites. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

Other crystalline microporous compositions are known which are not zeolitic (non-zeolitic molecular sieves or NZMS), but which exhibit the ion-exchange and/or adsorption characteristics of the zeolites. These include: 1) crystalline aluminophosphate compositions disclosed in U.S. Pat. No. 4,310,440; 2) silicon substituted aluminophosphates as disclosed in U.S. Pat. No. 4,440,871; 3) metal substituted aluminophosphates as disclosed in U.S. Pat. No. 4,853,197; 4) metal sulfide molecular sieves disclosed in U.S. Pat. No. 4,880,761 and 5) metallo zinc-phosphate compositions disclosed in U.S. Pat. No. 5,302,362.

Molecular sieves (both zeolitic and NZMS) are usually hydrothermally synthesized from a reaction mixture in a batch reactor. A continuous process would have the advantage of reduced capital investment, space requirement, operating costs, consistent quality, greater efficiency and waste handling. There are several references which teach continuous processes for the synthesis of zeolites. For example, EP 021675-B1 teaches using a continuous-stream process to prepare zeolites. The process involves preparing a reaction mixture and passing the mixture through a heated reaction zone.

U.S. Pat. No. 3,425,800 discloses a process for the continuous preparation of zeolites comprising forming a zeolitic gel and then supplying the gel to a stratified zone where the zeolite crystals form and settle downward into a lower stratum where they are collected.

U.S. Pat. No. 3,866,094 discloses a continuous process for preparing a hydrocarbon conversion catalyst which involves as one step continuously preparing a zeolite from a reaction mixture containing seed particles. U.S. Pat. No. 5,427,765 discloses preparing zeolite beta by first continuously forming granular amorphous aluminosilicate and then crystallizing the zeolite beta. Lastly, U.S. Pat. No. 5,100,636 discloses preparing zeolites by sending a reaction mixture through a pipe segment for an initial crystallization and then to an open vessel for a second crystallization.

In contrast to this art, applicants have developed a process to not only continuously prepare molecular sieves with high efficiency, but to also control the particle size and the particle size distribution. For example in the case of aluminosilicate zeolites, the process involves continuously adding reactive sources of aluminum, silicon, and at least one structure directing agent into a continuous crystallization reactor having at least two stages. The mixture thus formed is flowed through the reactor in order to crystallize the zeolite. Finally, an effective amount of interstage backmixing is introduced in order to control the particle size and particle size distribution. The greater the amount of backmixing (deviation from plug flow), the larger the particle size and the wider the particle size distribution. Alternatively, the approach to plug flow can be controlled by the number of stages in the reactor. The greater the number of stages, the closer the approach to 100% plug flow, i.e., batch performance.

In a specific embodiment of the invention, the molecular sieve product stream from the continuous reactor is split into at least two streams, each stream is continuously wet milled (in parallel) with different severity and then reblended. In this manner, one obtains at least a bimodal distribution. To applicants' knowledge, there is no mention in the art of ways to both continuously synthesize molecular sieves, control particle size and control particle size distribution.

SUMMARY OF THE INVENTION

As stated, this invention relates to a process for controlling the particle size of a molecular sieve. Accordingly, one embodiment of the invention is a process for controlling the particle size and particle size distribution of a molecular sieve during its synthesis, the molecular sieve having an empirical formula on an anhydrous basis of:

$$rR_2O{:}(Si_xAl_yP_z)O_2$$

where R is at least one structure directing agent, "r" has a value of 0 to about 1.0, "x", "y" and "z" are the mole fractions of silicon, aluminum and phosphorus respectively, "x" has a value from 0 to about 1.0, "y" has a value from 0 to about 0.6, "z" has a value from 0 to about 0.545; x+y+z=1; x+y>0; and when x>0 and y=0, then z=0, the process comprising:

a) introducing a reaction mixture into a continuous crystallization reactor having at least two stages, the reaction mixture having a formula expressed in terms of molar ratios of:

$$aR_2O{:}(Si_bAl_cP_d)O_2{:}eH_2O$$

where R is at least one structure directing agent, "a" has a value of greater than 0 to about 5; "b" has a value of about 0 to about 1.0; "c" has a value of 0 to about 1.0, "d" has a value of 0 to about 1.0 and "e" has a value from greater than zero to about 500; b+c+d=1; b+c>0; and when b>0 and c=0, then d=0;

b) flowing the reaction mixture through said continuous reactor, at reaction conditions, thereby crystallizing the molecular sieve;

c) controlling the particle size and particle size distribution by introducing an effective amount of interstage backmixing or by adjusting the number of stages, and;

d) recovering the molecular sieve.

Another embodiment of the invention is a process for continuously synthesizing a crystalline molecular sieve with at least a bimodal particle size distribution, the molecular sieve having an empirical formula on an anhydrous basis of:

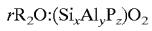

where R is at least one structure directing agent, "r" has a value of 0 to about 1.0; "x", "y" and "z" are the mole fractions of silicon, aluminum and phosphorus respectively, "x" has a value from 0 to about 1.0, "y" has a value from 0 to about 0.6; "z" has a value from 0 to about 0.545; x+y+z=1; x+y>0; and when x>0 and y=0, then z=0, the process comprising:

a) introducing a reaction mixture into a continuous crystallization reactor having at least two stages, the reaction mixture having a formula expressed in terms of molar ratios of:

where R is at least one structure directing agent, "a" has a value of greater than 0 to about 5; "b" has a value of about 0 to about 1.0; "c" has a value of 0 to about 1.0, "d" has a value of 0 to about 1.0 and "e" has a value from greater than zero to about 500; b+c+d=1; b+c>0; and when b>0 and c=0, then d=0;

b) flowing the reaction mixture through said continuous reactor, at reaction conditions, thereby crystallizing the molecular sieve;

c) controlling the particle size and particle size distribution by introducing an effective amount of interstage backmixing or by adjusting the number of theoretical stages, and;

d) splitting the molecular sieve stream of step (c) into at least two streams and flowing each stream to a wet miller, milling the molecular sieve stream in each miller with a different severity to give at least two streams of molecular sieves having different particle sizes;

e) recombining the separate molecular sieve streams to give a product with at least a bimodal particle size distribution; and f) recovering the molecular sieve product.

These and other objects and embodiments will become more evident after a detailed description of the invention.

DETAILED DESCRIPTION OF THE INVENTION

A process for continuously preparing molecular sieves and controlling the particle size and particle size distribution has been developed. The molecular sieves which can be prepared using this process include any of those which can be prepared by a batch process. This includes any of the synthetic zeolites and especially zeolites A, X and Y. However, the instant process is particularly attractive when the crystallization time (residence time in the reactor) is short or when the material of construction of the reactor is expensive, e.g., special alloys, since a continuous reactor is much smaller in size, and when high pressure is required.

The molecular sieves which can be prepared by the process of the invention can be described on an anhydrous basis by the empirical formula:

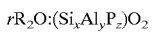

where R is at least one structure directing agent, "r" has a value of 0 to about 1.0; "x" is the mole fraction of silicon and varies from 0 to about 1.0, "y" is the mole fraction of aluminum and varies from 0 to about 0.6 and "z" is the mole fraction of phosphorus and varies from 0 to about 0.545. It is also required that x+y+z=1; x+y>0 and when x>0 and y is zero, then z is also zero. When z is zero and x and y are greater than zero, then the formula represents the family of aluminosilicate zeolites. Further, when both y and z are zero, one has silicalite. Finally, when x is zero and y and z are greater than zero, then one has the family of molecular sieves known as ALPOs. Examples of the zeolites which can be prepared include but are not limited to zeolite A, zeolite X, zeolite Y, mordenite, MFI, ZSM-5, and silicalite. Non-zeolitic molecular sieves include SAPO-11 and SAPO-34.

An essential part of the present invention involves continuously adding reactive sources of the desired elements along with at least one structure directing agent into a crystallization reactor and forming a reaction mixture. This reaction mixture is represented on a molar ratio basis, by the formula:

where R is at least one structure directing agent, "a" has a value of greater than 0 to about 5; "b" has a value of about 0 to about 1.0; "c" has a value of 0 to about 1.0, "d" has a value of 0 to about 1.0 and "e" has a value from greater than zero to about 500; b+c+d=1; b+c>0; and when b>0 and c=0, then d=0.

The structure directing agents which can be used are selected from the group consisting of alkali metals, alkali earth metals, organic templating agents, structure directing additives and mixtures thereof. The organic templating agents which can be used include any of those enumerated in U.S. Pat. No. 4,440,871 (such as quaternary ammonium compounds and amines) which is incorporated by reference. Specific examples include tetramethylammonium ion, tetraethylammonium ion, tetrapropylammonium ion or tetrabutylammonium ion cations where the counter ion can be a hydroxide, halide or nitrate. A variety of amines can also be used including but not limited to di-n-propylamine, triethylamine, piperidine, cyclohexylamine, 2-methylpyridine and N,N-dimethylbenzylamine.

Examples of the alkali and alkaline earth metals which can be used include but are not limited to sodium, lithium, potassium, cesium, magnesium, calcium and mixtures thereof. Reactive sources of the alkali metals and alkaline earth metals include without limitation the hydroxides, halides, nitrates, etc.

Aluminum sources include without limitation pseudoboehmite, sodium aluminate, gibbsite, aluminum alkoxide, aluminum trichloride and aluminum chlorohydrate; while silicon sources include without limitation, silica sol, silica gel, fumed silica, silicon alkoxides, sodium silicate, water glass and precipitated silica. Preferred aluminum sources are pseudoboehmite and aluminum alkoxide such as aluminum isopropoxide and preferred silica sources are silica sol and fumed silica.

It has been found that for the synthesis of zeolites 4A, 13X and Y a structure directing additive is a sodium aluminosilicate having the general formula on an anhydrous basis of:

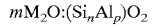

where M is sodium, "m" has a value of about 0.94, "n" has a value of about 0.88 and "p" has a value of about 0.12. The value of the above variables can vary ±15%. This additive is prepared in a batch manner using the same sources of silicon, aluminum and sodium as the reaction mixture described above. Use of this particular additive eliminates the crystallization of impurities and accelerates the synthesis of 4A, 13X and Y zeolites. One specific procedure for preparing this initiator are presented in U.S. Pat. No. 4,931,267 which is incorporated by reference.

The reactive sources of each of the components plus water are continuously added to a mixing chamber where a reaction mixture is formed. The reaction mixture can either be pumped as is or pumped through a heat exchanger to quickly heat it up to the crystallization temperature. In this respect, the crystallization temperature can vary from ambient temperature to about 250° C. Next the reaction mixture, regardless of whether it has gone through the heat exchanger or not, is flowed to a crystallization reactor. Alternatively, each component can be individually and simultaneously injected directly into the reactor. It is preferred to combine the desired sources into a mixing chamber which is then fed to the continuous reactor. This embodiment allows the gel to homogenize before being heated and also acts as a buffer to compensate for any fluctuations in flow rates and thus maintain a constant gel composition.

The continuous crystallization reactor is usually a multi-stage (at least two) cylindrical reactor, having a pumping means to move the reaction mixture through the reactor. Pumping means include impellers, pressure pulses, blade mixers, etc. The reactor further contains baffles, vanes or cells which define a stage. A theoretical or ideal stage is equivalent to one continuously stirred tank reactor (CSTR). Since there will always be some backmixing, the reactor will be said to have "stages" instead of "theoretical stages". Thus, the reactor has from 2 to about 100 stages.

The number of stages and/or the amount of interstage backmixing is used to control the approach to or deviation from 100% plug flow. A 100% plug flow performance will lead to a molecular sieve product with a morphology substantially the same as that produced from a batch process. Although the instant process can be operated at any percent of plug flow, it is preferred to operate at about 50% to about 100% plug flow performance.

As stated, approach to plug flow can be controlled by the number of stages in the continuous reactor. The greater the number of stages, the greater the approach to plug flow. Alternatively, deviation from plug flow can be controlled by the amount of interstage backmixing present in the reactor with greater backmixing resulting in a greater deviation from 100% plug flow. One way to introduce interstage backmixing is by taking a stream from one stage, bypassing the stage immediately before or after the first stage, and recycling a stream from the receiving stage back to the original stage. For example, if a reactor contains 5 stages, a portion from the first stage can be bypassed to the $3^{rd}$ stage and a portion from the $3^{rd}$ stage recycled back to the first stage. The size of the withdrawn and recycled stream determines the amount of interstage backmixing. Backmixing can also be controlled by adjusting the process parameters including impeller speed (mixing level), impeller design, interstage annular area, annular path within the reactor and viscosity of the reaction mixture.

The size of the reactor is not critical, provided the size is sufficient to fully crystallize the molecular sieve and provide the desired particle size and particle size distribution. Thus, the flow rate and number of stages, i.e., length, can be adjusted to control the volume of molecular sieve produced. Increasing the flow rate and number of stages allows the volume of product to be increased. Also the amount of time necessary to crystallize the molecular sieve will affect the size of the reactor with longer crystallization times requiring longer reactors.

The reaction conditions in the reactor include a temperature of ambient to about 250° C. and a pressure sufficient to ensure that there is substantially no vapor present. Generally, a pressure of 69 kPag (10 psig) above the vapor pressure of the reaction mixture is sufficient but pressures of 1,033 kPag (150 psig) or more above the vapor pressure of the reaction mixture can be used.

The particle size distribution can also be controlled by modifying the above procedure as follows. Sufficient interstage backmixing is introduced such that the particle size of the molecular sieve is increased. The product molecular sieve stream is next split into two or more streams and each stream is now sent to a miller and milled (in parallel) at different severities thereby giving different particle size distribution and thus at least a bimodal distribution. By controlling the severity in the mills, one can control not only the average particle size, but also the particle size distribution, i.e., narrow or broad. The severity is controlled by the speed of the mill and the size of the media. The time in the separate mills should be the same.

The following examples are presented in illustration of this invention and are not intended as undue limitations on the generally broad scope of the invention as set out in the appended claims.

EXAMPLE 1

A synthesis gel was prepared by simultaneously mixing a sodium silicate solution, sodium hydroxide and sodium aluminate and a structure directing additive (1% by weight) which had the formula of: $16Na_2O:15\ SiO_2:Al_2O_3$ (on an anhydrous basis) to give the following reactor mixture:

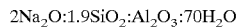

$$2Na_2O:1.9SiO_2:Al_2O_3:70H_2O$$

This mixture was placed into a reactor, stirred and heated to 100° C. for about 45 minutes under autogenous pressure. The product isolated was confirmed to have the x-ray diffraction pattern of 4A zeolite and had an average particle size of about 3 microns.

EXAMPLE 2

The 4A zeolite described in example 1 was prepared using a continuous process as follows. Sodium silicate solution, sodium hydroxide solution, sodium aluminate solution and the structure directing additive were simultaneously flowed into a feed tank. The structure directing additive was added as a dilute suspension or slurry. This mixture was then heated to about 100° C. and then flowed to a continuous reactor having a total of 20 stages which corresponds to about 95% of plug flow. The 4A zeolite produced from this reactor had an average particle size of 8.27 microns.

EXAMPLE 3

A 4A zeolite was prepared as in example 2 except that the plug flow reactor had about 78 stages with a 98% approach to plug flow. The 4A zeolite was found to have an average particle size of 4.07 microns.

EXAMPLE 4

A 4A zeolite was prepared using a reaction mixture prepared as in example 2. This mixture was flowed to a 7.6 liter (6.0 inch diameter) continuously stirred tank reactor (CSTR) composed of 5 stages separated by four horizontal baffles. Each stage had its own impeller mounted on the same central shaft. The bottom stage had a 4-blade propeller which provided high pumping capacity and mass flow of the reaction mixture. This five stage CSTR had a 71.2% approach to plug flow and produced zeolite 4A particles with an average diameter of about 16.8 microns.

We claim as our invention:

1. A process for continuously synthesizing a crystalline molecular sieve with at least a bimodal particle size distribution, the molecular sieve having an empirical formula on an anhydrous basis of:

$$rR_2O:(Si_xAl_yP_z)O_2$$

where R is at least one templating agent, "r" has a value of 0 to about 1.0; "x", "y" and "z" are the mole fractions of silicon, aluminum and phosphorus respectively, "x" has a value from 0 to about 1.0, "y" has a value from 0 to about 0.6, "z" has a value from 0 to about 0.545; x+y+z=1; x+y>0; and when x>0 and y=0, then z=0, the process comprising:

a) introducing a reaction mixture into a continuous crystallization reactor having at least two stages, the reaction mixture having a formula expressed in terms of molar ratios of:

$$aR_2O:(Si_bAl_cP_d)O_2:eH_2O$$

where R is at least one structure directing agent, "a" has a value of greater than 0 to about 5; "b" has a value of about 0 to about 1.0; "c" has a value of 0 to about 1.0, "d" has a value of 0 to about 1.0 and "e" has a value from greater than zero to about 500; b+c+d=1; b+c>0; and when b>0 and c=0, then d=0;

b) flowing the reaction mixture through said continuous reactor, at reaction conditions, thereby crystallizing the molecular sieve;

c) controlling the particle size and particle size distribution of the molecular sieve by introducing an effective amount of interstage backmixing or by adjusting the number of stages, and;

d) splitting the molecular sieve stream of step (c) into at least two streams and flowing each stream to a wet miller and milling the molecular sieve stream in each miller with a different severity to give at least two streams of molecular sieves having different particle sizes;

e) recombining the separate molecular sieve streams to give a product with at least a bimodal distribution; and f) recovering the molecular sieve product.

2. The process of claim 1 where R is a structure directing agent selected from the group consisting of alkali metals, alkaline earth metals, organic templating agents, structure directing additives and mixtures thereof.

3. The process of claim 2 where R is an alkali metal selected from the group consisting of sodium, lithium, potassium, cesium and mixtures thereof.

4. The process of claim 2 where R is an alkaline earth metal selected from the group consisting of magnesium, calcium and mixtures thereof.

5. The process of claim 2 where R is an organic templating agent selected from the group consisting of quaternary ammonium ions, amines and mixtures thereof.

6. The process of claim 2 where R is a structure directing additive having the empirical formula on an anhydrous basis of: $mM_2O:(Si_nAl_p)O_2$ where "m" has a value of about 0.94, "n" has a value of about 0.88, "p" has a value of about 0.12 and M is sodium.

7. The process of claim 1 where the aluminum source is selected from the group consisting of pseudoboehmite, sodium aluminate, gibbsite, aluminum alkoxides, aluminum trichloride and aluminum chlorohydrate.

8. The process of claim 1 where the silicon source is selected from the group consisting of silica sol, silica gel, fumed silica, silicon alkoxides, sodium silicate, water glass and precipitated silica.

9. The process of claim 1 where the reaction conditions include a temperature of ambient to about 250° C. and a pressure of about 69 kPag to about 1033 kPag above the vapor pressure of the reaction mixture.

10. The process of claim 1 where the crystallization reactor contains from 2 to about 100 stages.

11. The process of claim 1 where sources of aluminum, silicon, phosphorus and at least one structure directing agent which make up the reaction mixture are each individually and continuously introduced into the continuous crystallization reactor.

12. The process of claim 1 where sources of aluminum, silicon, phosphorous and at least one structure directing agent are first flowed to a mixing chamber to form a reaction mixture and then to the crystallization reactor.

13. The process of claim 12 where the reaction mixture is first flowed through a heat exchanger to heat up the reaction mixture to its crystallization temperature and then flowed to the crystallization reactor.

* * * * *